A. P. MALLON.
STEEL TIRE.
APPLICATION FILED SEPT. 3, 1921.

1,426,585.

Patented Aug. 22, 1922.

2 SHEETS—SHEET 1.

Inventor:
A. P. Mallon
Attorneys.

A. P. MALLON.
STEEL TIRE.
APPLICATION FILED SEPT. 3, 1921.

1,426,585.

Patented Aug. 22, 1922.
2 SHEETS—SHEET 2.

Inventor:
A. P. MALLON
Attorneys.

UNITED STATES PATENT OFFICE.

ALOYSIUS PAUL MALLON, OF SAN FRANCISCO, CALIFORNIA.

STEEL TIRE.

1,426,585.   Specification of Letters Patent.   Patented Aug. 22, 1922.

Application filed September 3, 1921. Serial No. 498,235.

*To all whom it may concern:*

Be it known that I, ALOYSIUS PAUL MALLON, a citizen of the United States, and resident of San Francisco, county of San Francisco, and State of California, have invented a new and useful Steel Tire, of which the following is a specification.

The present invention relates to improvements in tires for motor vehicles generally and more specifically to steel tires, and its object is to provide a tire made of steel or similar rigid material and to arranged the units composing the tire in such a manner as to secure elasticity equivalent to that obtained by the air cushion enclosed in the pneumatic tube now commonly used.

Figure 1:
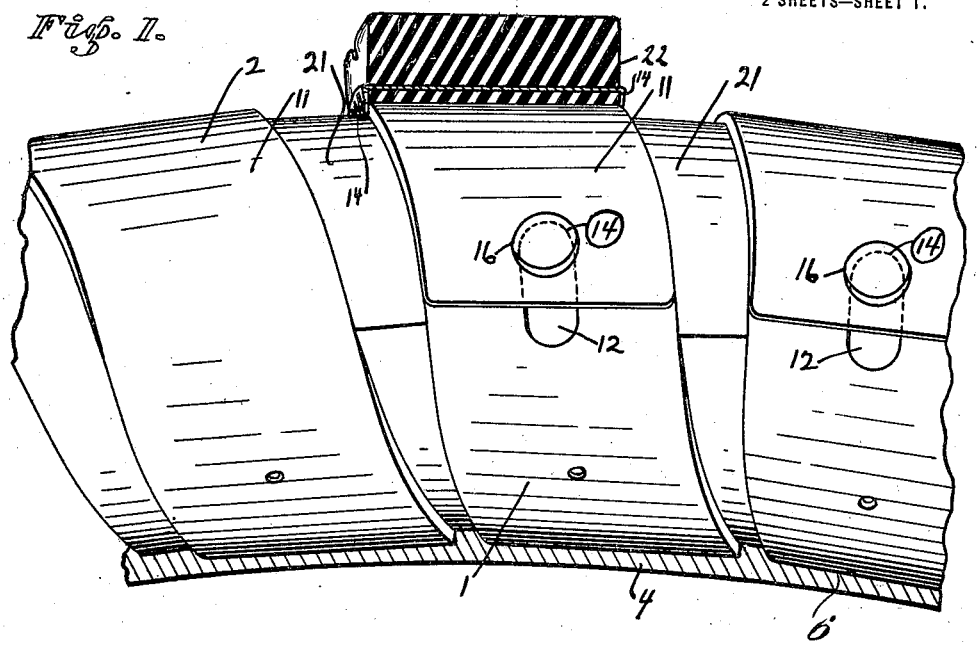
Figure 2:
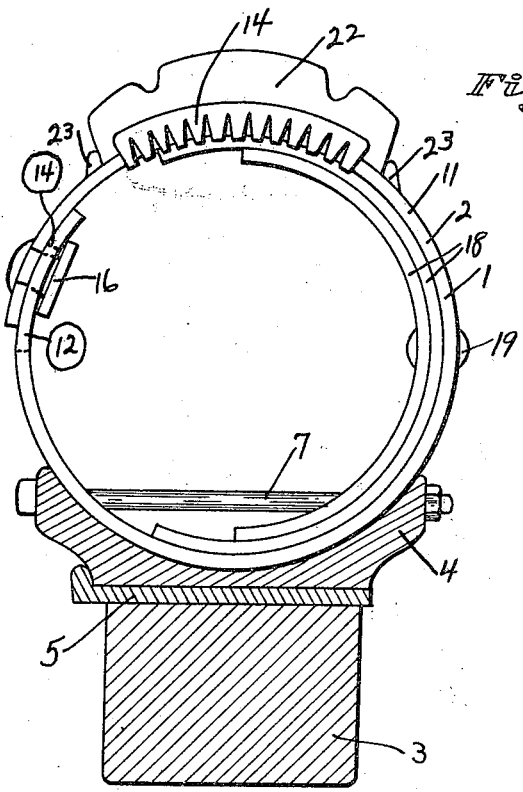
Figure 3:
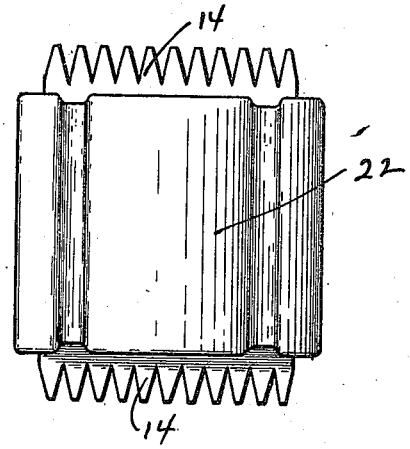
Figure 4:
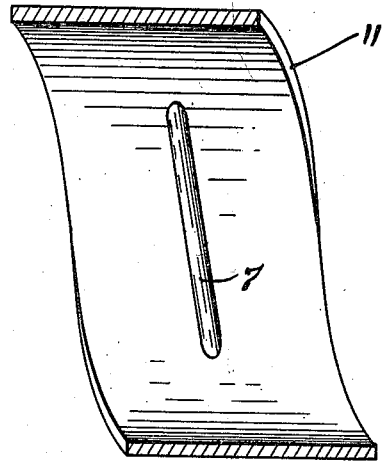
Figure 5:
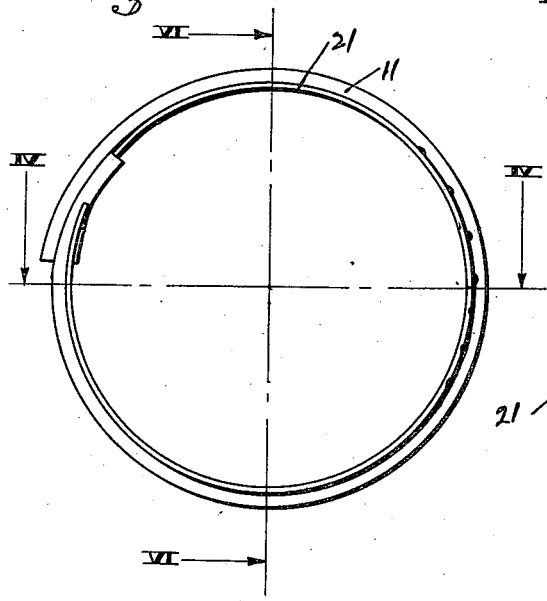
Figure 6:
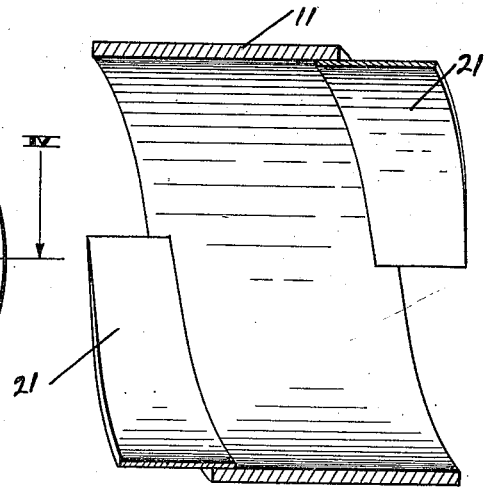

The preferred form of my invention is illustrated in the accompanying drawing in which Figure 1 represents a side elevation of a portion of my steel tire the rim of the wheel and a cushioning member being shown in section; Figure 2 an end view of a single tire unit showing the means for fastening it to the rim of the wheel; Figure 3 an enlarged detail view of a cushion used on the outer periphery of the tire; Figure 4 a horizontal section along line 4—4 of Figure 5; Figure 5 a detail side elevation of a detached tire unit, and Figure 6 a vertical section along line 6—6 of Figure 5.

Referring to the drawings in detail, my tire (1) is shown as consisting of a spirally wound band (2), bent into an annular ring of the size of the ordinary motor vehicle tire. The wheel, shown in a fragmentary manner, and comprising the felloe (3), the rim proper (4) and the felly band (5), is provided with spiral grooves (6) in its rim corresponding in size to the width of the spiral band so that the latter will snugly fit on the rim. For holding the band in firm engagement with the wheel rim, I provide a plurality of transverse bolts (7), which penetrate rim and tire and prevent any working loose of the latter.

The metal band is made of rather heavy material so as to insure good wearing qualities, and in order to impart to it besides strength a certan springiness and elasticity, I provide two means, one of which allows the tire to yield to radial pressure while the other braces it elastically against radial pressure.

To allow the tire to yield to radial pressure I use a plurality of units (11) to construct the tire and provide at each joint a slot (12) in the end of one member, a circular perforation (14) in the end of the adjoining member and a stud (16) headed at both ends for penetrating both slot and circular perforation and thus secure one end to the other, the stud being able to play in the slot and to thus yield to radial pressure on the outer circumference. I preferably use units of two different sizes and alternate a short one with a long one, the short ones being equal in length to the transverse circumference of the tire plus extensions for laps, while the others are longer by a one-half of the circumference. In this manner I secure a proper distribution of the joints. The latter should, of course, be disposed along the side of the tire and preferably alternately on opposite sides, which arrangement is obtained by the alternation of the units as aforesaid, the joints alternating in pairs.

To brace the tire against radial pressure I provide a plurality of leaf springs (18) internally secured to the units on the sides opposite the joints as shown at (19), the tips of which tend to spread the units outwardly. These springs can be made of any desired strength and by selecting the proper proportions for the springs a tire can be constructed that is both substantial and elastic.

The space between the spirals is filled by side flaps (21), one edge of which is preferably welded to the inside of the metal band so as to fit underneath the adjoining spiral and to completely fill the space between the spirals. In order to obtain a still better cushioning effect I provide a block (22) of cushioning material such as rubber on each spiral. These blocks are alined with each other and disposed so as to protect the outer circumference of the tire. They are curved to follow the outline of the spiral and rest transversely against two projections (23) rising from the spiral band in parallel and spaced relation, while they are held against longitudinal or peripheral motion by toothed clamping members (14), the teeth of which are adapted to be turned underneath the edges of the spiral band.

I claim:

1. A steel tire comprising a band of spring steel spirally wound into an annular ring and consisting of a plurality of longitudinal members yieldingly connected to each other and a plurality of side flaps secured to the longitudinal members for covering the spaces between the same.

2. A steel tire comprising a band of spring steel spirally wound into an annular ring and consisting of a plurality of longitudinal members yieldingly connected to each other and a plurality of internal fortifying springs secured to the sides of the annular ring and bracing the same transversly.

3. The combination of a wheel rim and a steel tire, comprising a band of spring steel spirally wound into an annular ring and consisting of a plurality of longitudinal members yieldingly connected to each other and a plurality of side flaps secured internally to the longitudinal members for covering the spaces between the same, and a spiral groove in the rim for receiving the band.

4. A steel tire comprising a band of spring steel spirally wound into an annular ring and consisting of a plurality of longitudinal members yieldingly connected to each other, a plurality of side flaps secured to the longitudinal members for covering the spaces between the same, and a plurality of cushioning members secured to the band along the outer periphery of the tire.

ALOYSIUS PAUL MALLON.